United States Patent
Ballagas (10) Patent No.: US 12,471,817 B2
(45) Date of Patent: Nov. 18, 2025

(54) IDENTIFYING DIFFERENCES BETWEEN PHYSIOLOGICALLY-IDENTIFIED SIGNIFICANT PORTIONS OF A TARGET AND MACHINE-IDENTIFIED SIGNIFICANT PORTIONS

(71) Applicant: Hewlett-Packard Development Company, L.P., Spring, TX (US)

(72) Inventor: Rafael Ballagas, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1073 days.

(21) Appl. No.: 17/311,074

(22) PCT Filed: Apr. 11, 2019

(86) PCT No.: PCT/US2019/026913
§ 371 (c)(1),
(2) Date: Jun. 4, 2021

(87) PCT Pub. No.: WO2020/209856
PCT Pub. Date: Oct. 15, 2020

(65) Prior Publication Data
US 2022/0039713 A1    Feb. 10, 2022

(51) Int. Cl.
| | |
|---|---|
| A61B 5/16 | (2006.01) |
| A61B 5/369 | (2021.01) |
| G06F 3/01 | (2006.01) |
| G06N 20/00 | (2019.01) |

(52) U.S. Cl.
CPC ............. *A61B 5/163* (2017.08); *A61B 5/165* (2013.01); *A61B 5/369* (2021.01); *G06F 3/013* (2013.01); *G06N 20/00* (2019.01)

(58) Field of Classification Search
CPC ......... A61B 5/163; A61B 5/165; A61B 5/369; A61B 5/168; A61B 3/112; A61B 3/113; A61B 5/024; A61B 5/0533; A61B 5/055; A61B 5/0816; G06F 3/013; G06N 20/00; G16H 30/40; G16H 50/20; G16H 50/70
See application file for complete search history.

(56) References Cited

U.S. PATENT DOCUMENTS

| | | | |
|---|---|---|---|
| 7,490,085 B2 | 2/2009 | Walker et al. | |
| 8,214,309 B1 * | 7/2012 | Khosla | G06N 3/042 706/14 |
| 8,374,687 B2 | 2/2013 | Mathan et al. | |
| 9,443,205 B2 | 9/2016 | Wall | |
| 2004/0122790 A1 * | 6/2004 | Walker | A61B 5/318 |

(Continued)

FOREIGN PATENT DOCUMENTS

| | | |
|---|---|---|
| CN | 106796603 A | 5/2017 |
| CN | 107924472 A | 4/2018 |

(Continued)

*Primary Examiner* — Amit Chatly
(74) *Attorney, Agent, or Firm* — Quarles & Brady LLP (57) ABSTRACT

An example system includes an analysis engine to detect a first set of significant portions of a target. The system includes an event engine to detect a set of potential events in a physiological signal and identify a second set of significant portions of the target based on the set of potential events. The system includes a comparison engine to identify a difference between the first set of significant portions and the second set of significant portions.

12 Claims, 6 Drawing Sheets

(56) References Cited

U.S. PATENT DOCUMENTS

| | | | |
|---|---|---|---|
| 2007/0236488 A1 | 10/2007 | Mathan et al. | |
| 2009/0171871 A1 | 7/2009 | Zhang et al. | |
| 2011/0206283 A1* | 8/2011 | Quarfordt | G06V 40/193 |
| | | | 382/220 |
| 2014/0347265 A1 | 11/2014 | Aimone et al. | |
| 2016/0098393 A1 | 4/2016 | Hebert | |
| 2017/0251985 A1 | 9/2017 | Howard | |
| 2018/0089531 A1* | 3/2018 | Geva | G06V 10/763 |
| 2018/0239430 A1 | 8/2018 | Tadi et al. | |
| 2018/0314327 A1* | 11/2018 | Digirolamo | G06F 3/013 |
| 2019/0065598 A1 | 2/2019 | Zhou et al. | |

FOREIGN PATENT DOCUMENTS

| | | |
|---|---|---|
| CN | 109416835 A | 3/2019 |
| CN | 109543028 A | 3/2019 |
| TW | 201816645 A | 5/2018 |

* cited by examiner

IDENTIFYING DIFFERENCES BETWEEN PHYSIOLOGICALLY-IDENTIFIED SIGNIFICANT PORTIONS OF A TARGET AND MACHINE-IDENTIFIED SIGNIFICANT PORTIONS

BACKGROUND

A computer may input data, analyze the data, and output the results of the analysis. For example, the computer may analyze an image, which may be a captured by an imaging device or may have been stored in a storage device. The computer may use computer vision techniques to detect features in the image, segment objects of interest, or the like. The computer may indicate the detected features, segmented objects, etc. to the user or may store indications of their locations in the storage device.

DETAILED DESCRIPTION

As computers become increasingly capable, they are able to perform tasks, such as diagnostic tasks, with proficiencies approaching or exceeding those of humans. For example, computers may be used to analyze medical images that might otherwise be analyzed by a doctor. In such situations, people may over rely on the computer to make the decisions rather than applying their own abilities. When a person sees the results of the computer analysis, the person may not be able to forget or disregard the results, which may skew the person's analysis. Alternatively, or additionally, disagreements with the computer may be rare events, so a person reviewing a computer's work may spend most of their time applying lower levels of thought and analysis. Such lower levels of thought and analysis may stupefy the person into missing the rare events. Also, the person's abilities may atrophy and be lost due to the over reliance on computers. In the medical image example and other health and safety critical examples, the failure of people and computers to work effectively together may create catastrophic results.

One option to avoid such results is to forgo use of the computer to perform the task. However, forgoing use of the computer can create its own set of tragic yet avoidable results. A computer can be quickly and efficiently updated with the most recent analysis techniques and does not suffer from human failings. Thus, the computer may perform better than the person in some instances. Either option, using the computer or forgoing the computer, can create poor outcomes and potentially liability. Accordingly, better performance could be achieved by allowing computers to assist people in performing tasks in a manner that does not impede the performance of the people engaged in the task.

In an example, the results from computer analysis can be compared to the results from human analysis, so the differences can be indicated to a user. However, comparison of these results may lack details from the analysis process. As a result, the comparison may unnecessarily identify differences or create additional work for a user due to the lack of details. For example, a human may have analyzed a portion of a target, spotted a potential issue, and realized the potential issue, but the human may have determined the potential issue was not an actual issue. Alternatively, or additionally, the computer and human may have similar results but different conclusions about whether those results exceed a threshold. Computer cooperation with a human on a task could be improved by providing clarity about where the computer and the human disagree in their analysis.

Figure 1:
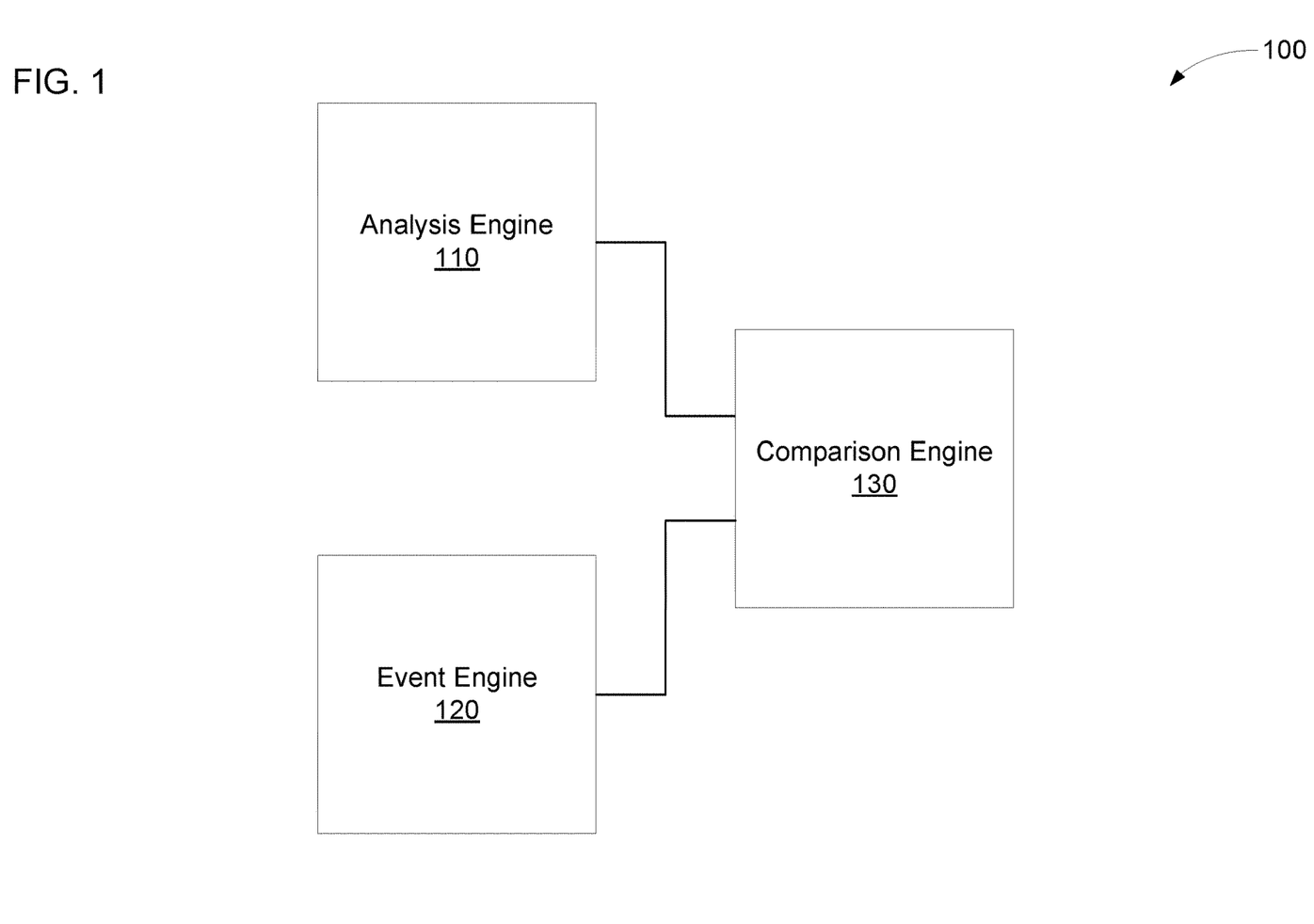
FIG. 1 is a block diagram of an example system to identify differences between physiologically-identified significant portions of a target and machine-identified significant portions.

FIG. 1 is a block diagram of an example system 100 to identify differences between physiologically-identified significant portions of a target and machine-identified significant portions. The system 100 may include an analysis engine 110. As used herein, the term "engine" refers to hardware (e.g., analog or digital circuitry, a processor, such as an integrated circuit, or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random-access memory (RAM), a hard-disk or solid-state drive, resistive memory, or optical media such as a digital versatile disc (DVD), and/or executed or interpreted by a processor), or hardware and software hosted at hardware.

The analysis engine 110 may detect a first set of significant portions of a target. For example, the analysis engine 110 may evaluate the target to determine whether a portion of the target satisfies a condition for inclusion in the first set of significant portions. The analysis engine 110 may include the portion of the target in the first set of significant portions based on the portion satisfying the condition.

The system 100 may also include an event engine 120. The event engine 120 may detect a set of potential events in a physiological signal. As used herein, the term "potential event" refers to a location in time of a portion of a physiological signal corresponding to a physiological response indicative of the brain responding to a stimulus. For example, the physiological signal may be an electroencephalogram (EEG), a functional magnetic resonance image (fMRI), a measurement of pulse, a measurement of respiration rate, a measurement of galvanic skin response (GSR), a measurement of pupil dilation, an analysis of facial expression, or the like. The physiological response may be an event-related potential (ERP) (e.g., a P300 or P3b ERP detectable in an EEG or fMRI), an increase in pulse, respiration rate, skin conductivity, pupil dilation, etc., a predetermined facial expression, or the like.

In an example, the event engine 120 may detect the potential event by analyzing the physiological signal to determine whether the values of the signal are indicative of a predetermined physiological response. Based on the values being indicative of the predetermined physiological response, the event engine 120 may include the potential event in the set of potential events. The event engine 120 may identify a second set of significant portions of the target based on the set of potential events. For example, the event engine 120 may determine the portion of the target that elicited the physiological response corresponding to the potential event. The event engine 120 may include the portion of the target that elicited the physiological response in the second set of significant portions.

As used herein, the term "target" refers to an environment or object that can be sensed by a living thing or data usable to produce an output that can be sensed by a living thing. The target may include an image, a three-dimensional scene, an audio signal, a touch target (e.g., an environment or object that can be sensed through touch, data usable to produce a haptic output, etc.), a smell, a taste, a temperature, or the like. For example, the target may be a medical image to be evaluated by a doctor, a building to be evaluated by a fire inspector or an Occupational Safety and Health Administration (OSHA) inspector, a sonar technician, or the like. In some examples, the analysis engine 110 may act directly on the target (e.g., when the target is an image or audio signal stored on a computer-readable medium or the like) or may act on data resulting from sensor measurements of the target (e.g., when the target is a three-dimensional scene, a tangible image, sound wave propagating through a medium, or the like). Similarly, the living thing producing the physiological signal may directly sense the target or may sense an output generated based on the target. The living thing that produces the physiological signal may be a human, an animal, or the like.

The system 100 may include a comparison engine 130. The comparison engine 130 may identify a difference between the first set of significant portions and the second set of significant portions. For example, the comparison engine 130 may determine the analysis engine 110 identified a portion of the target as significant but that portion of the target did not generate a physiological response in the living thing. Alternatively, or additionally, the comparison engine 130 may determine a portion of the target caused a physiological response in the living thing but the analysis engine 110 did not identify that portion as significant.

Figure 2:
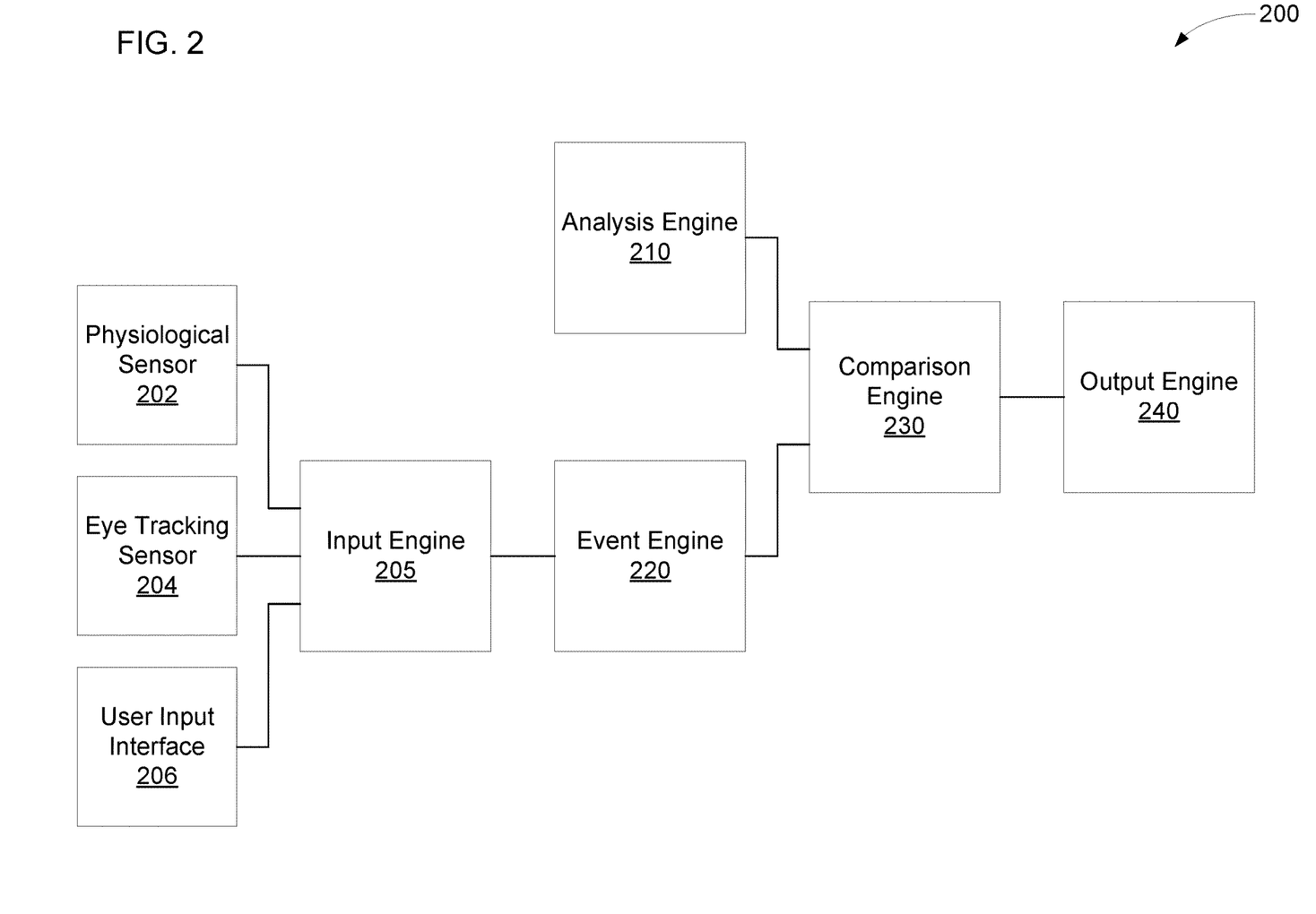
FIG. 2 is a block diagram of another example system to identify differences between physiologically-identified significant portions of a target and machine-identified significant portions.

FIG. 2 is a block diagram of another example system 200 to identify differences between physiologically-identified significant portions of a target and machine-identified significant portions. The system 200 may include an analysis engine 210. The analysis engine 210 may detect a first set of significant portions of a target. For example, the analysis engine 210 may receive the target from a storage device (not shown), such as a computer-readable medium, may receive data measurements resulting from sensor measurements of the target by a sensor (not shown), or the like. In the illustrated example, the analysis engine 210 may receive image data from the storage device, receive image data from a camera (e.g., image data of an environment or of a tangible image), or the like.

The analysis engine 210 may evaluate the target to determine whether a portion of the target satisfies a condition for inclusion in the first set of significant portions. For example, the analysis engine 210 may use computer vision techniques to detect significant portions of the target. In an example, the analysis engine 210 may evaluate the target using a machine-learning model to detect the significant portions of the target. For example, the machine-learning model may have been trained to detect significant portions of the target using a data set that includes targets that include significant portions and targets that do not include significant portions. In some examples, the analysis engine 210 may a soft output (e.g., a probability) that indicates how likely it is that a particular portion is significant. The analysis engine 210 may include portions corresponding to a soft output that satisfies a particular threshold in the first set of significant portions. For example, the analysis engine 210 may store an indication (e.g., a representation of the location) of the portion of the target determined to be significant.

The system 200 may include an input engine 205. The input engine 205 may measure a physiological signal. For example, the input engine 205 may be communicatively coupled to a physiological sensor 202 that generates the physiological signal based on measurements of the physiological response of a user (e.g., a living thing). The input engine 205 may also measure eye tracking data for the user. For example, the input engine 205 may be communicatively coupled to an eye tracking sensor 204 and may receive the eye tracking data from the eye tracking sensor 204. In an example, the eye tracking sensor 204 may provide images to the input engine 205, and the input engine 205 may determine the eye tracking data from the images. The input engine 205 may also be communicatively coupled to a user input interface 206 to receive user input. The input engine 205 may receive a set of user-indicated significant portions based on the user providing input indicating significant portions. The user input interface 206 may include a keyboard, a mouse, a touch screen, a camera, a microphone, or the like.

The system 200 may include an event engine 220 communicatively coupled to the input engine 205. The event engine 220 may receive the physiological signal from the input engine 205 and may detect a set of potential events in the physiological signal. For example, the event engine 220 may determine whether a portion of the physiological signal satisfies a criterion (e.g., satisfies a threshold, satisfies a threshold for a predetermined time period, has a correlation with a predetermined signal that satisfies a threshold, or the like). The event engine 220 may select each location of the portion of the physiological signal that satisfies the criterion as a potential event. For example, the event engine 220 may store an indication of the location of the portion of the physiological signal that satisfies the criterion.

The event engine 220 may identify a second set of significant portions of the target based on the set of potential events. For example, the event engine 220 may compare the eye tracking data to the set of potential events to identify the second set of significant portions. The eye tracking data may include which portion of the target was being observed at various points in time. Accordingly, the event engine 220 can determine the portion of the target that was the stimulus for the potential event. The event engine 220 may compensate for a delay between stimulus and physiological response to determine a time of the stimulus from the potential event. The event engine 220 may compare the time of the stimulus to the eye tracking data to identify the portion of the target that was the stimulus. The event engine 220 may include the identified portion of the target in the second set of significant portions of the target. For example, the event engine 220 may store an indication (e.g., a representation of the location) of the identified portion of the target.

Although the system 200 includes an eye tracking sensor 204 in the illustrated example, which may involve a visual target, other sensors may be used for other types of targets. For example, for a touch target, the system 200 may include a sensor to track the portion of the user touching the touch target. In some examples, the target may vary over time, but the user may not actively change their sensory organs while sensing the target. The event engine 220 may identify the portion of the target that was the stimulus based on which portion of the target was being sensed at each time without a state of a sensory organ of the user.

The system 200 may include a comparison engine 230. The comparison engine 230 may identify a difference between the first set of significant portions and the second set of significant portions. The difference may be a portion included in the first set but not the second set or a portion included in the second set but not the first set. In some examples, the first set or the second set may be an empty set. For example, one of the analysis engine 210 and the event engine 220 may have identified a portion of the target as being significant but the other may not have identified any portions of the target as being significant. The system 200 may also include an output engine 240 to generate an indication of the difference between the first set of significant portions and the second set of significant portions and to cause the indication to be provided to a user. For example, the output engine 240 may provide a visual, audible, or the like indication of the difference. For example, the output engine 240 may overlay the indication of the difference on the target or a copy of the target. In an example, the comparison engine 230 or output engine 240 may store indications of the differences without providing the indications to the user.

The comparison engine 230 or the output engine 240 may identify various types of differences and may treat them differently. The analysis engine 210 may have identified a portion of the target as being significant, but the event engine 220 may not have identified that portion of the target as being significant. For example, the user may not have observed that portion of the target, or the user may have observed that portion of the target and not realized its significance, which was evidenced by a lack of physiological response. Accordingly, the output engine 240 may indicate these portions of the target to the user so the user can further analyze them (e.g., using a first indication). In some example, the output engine 240 may provide different indications depending on whether the user did not observe the portion of the target or observed the portion of the target but did not have a physiological response.

Alternatively, or additionally, the event engine 220 may have identified the portion of the target as being significant, but the analysis engine 210 may not have identified the portion of the target as being significant. For example, the user's reaction to the portion of the target may be a false positive, or the analysis engine 210 have failed to recognize the significance of the target and so may be amenable to updating. The output engine 240 may indicate these portions to the user for further analysis, for example, to determine why the disagreement occurred (e.g., using a second indication).

The comparison engine 230 may further compare the set of user-indicated significant portions to the first set of significant portions or the second set of significant portions. For example, the event engine 220 may have identified the portion of the target as significant, but neither the analysis engine 210 nor the user may have indicated that the portion of the target was significant. Accordingly, there may be less reason to indicate the difference to the user because the user consciously decided not to identify the portion of the target as significant despite the user's initial reaction. The output engine 240 may not indicate the difference to the user, may provide a less conspicuous indication of the difference (e.g., using a third indication), provide the user with the option of whether or not to receive indications of such differences, or the like.

In an example, the event engine 220 and the analysis engine 210 may have identified the portion of the target as significant, but the user many not have indicated the portion of the target was significant. Again, there may be less reason to indicate the difference to the user. The user has again consciously decided not to identify the portion as significant despite the user's initial reaction, so the decision by the analysis engine 210 may have little effect on the user's decision if presented. The output engine 240 may not indicate the difference to the user, may provide a less conspicuous indication of the difference (e.g., using a fourth indication), provide the user with the option of whether or not to receive indications of such differences, or the like.

The comparison engine 230 or the output engine 240 may further use the soft output from the analysis engine 210 to provide additional nuance in identifying differences or additional detail in the indications the user. For example, where the analysis engine 210 and the event engine 220 identified a portion of the target as significant but the user did not, the comparison engine 230 may determine how near the soft output is to a threshold or may modify the threshold. The output engine 240 may not indicate the difference or may use a different or less conspicuous indication based on the soft output being within a particular distance of the threshold or satisfying the modified threshold. Similarly, where the user identified a portion as significant but the analysis engine 210 did not, the comparison engine 230 may determine how near the soft output is to the threshold or may modify the threshold. The output engine 240 may not indicate the difference or may use a different or less conspicuous indication based on the soft output being within a particular distance of the threshold or satisfying the modified threshold.

In an example, the event engine 220 may identify a portion of the target as significant but the analysis engine 210 and the user may not. The comparison engine 230 may determine how near the soft output is to the threshold or may modify the threshold. The output engine 240 may indicate the difference (e.g., using an indication with limited conspicuousness) based on the soft output being within a particular distance of the threshold or satisfying the modified threshold. In some examples, the user may indicate that user is unsure of significance or that additional investigation or testing should be performed. The comparison engine 230 may determine whether the soft output is within a particular range. The output engine 240 may indicate to the user if the soft output is outside the range, which could indicate that the analysis engine 210 is confident that the portion of the target is significant or is confident that the portion of the target is not significant. In some examples, the output engine 240 may indicate that the soft output for a portion of the target is in a range indicating uncertainty, for example, when the event engine 220 does not identify the portion of the target as significant, when the event engine 220 identifies the portion of the target as significant but the user does not, when the user identifies the portion of the target as significant, or the like.

The comparison engine 230 may determine that a portion of the target was identified as significant by both the user and the analysis engine 210. In such a situation, the comparison engine 230 may improve user productivity by automatically preparing an annotation describing a reason the actually significant portion was identified. For example, the comparison engine 230 may determine why the portion of the target was significant based on which neurons activated most strongly in the machine-learning model of the analysis engine 210, or the comparison engine 230 may include an additional machine-learning model to determine the reason for significance based on the portion of the target.

In some examples, the output engine 240 may indicate differences to the user in substantially real time. For example, the input engine 205 or event engine 220 may determine when the user is observing a portion of the target identified by the analysis engine 210 as being significant. Responsive to the event engine 220 not detecting a potential event in response to the user observing that portion of the target, the output engine 240 may indicate the difference in substantially real time. The input engine 205 or event engine 220 may cause the output engine 240 to indicate the difference based on the user moving observation to a new portion of the target, based on a time threshold being exceeded, or the like. In an example, in response to the user indicating a significant portion of the target not identified by the analysis engine 210, the output engine 240 may indicate the difference in substantially real time. As used herein, the term "substantially real time" refers to indications that are provided in direct response to a user action or the non-occurrence of the potential event but that may be delayed due to time spent detecting the user action or the non-occurrence of the potential event or due to processing delays.

The analysis engine 210 may update a machine-learning model based on the differences identified by the comparison engine 230. In an example, the output engine 240 may indicate to the user any of the previously discussed types of differences between the first set of significant portions of the target, the second set of significant portions of the target, or the set of user-indicated significant portions of the target. The user may provide additional input to the user input interface 206, and the input engine 205 may identify a revised set of user-indicated significant portions of the target. The analysis engine 210 may update the machine-learning model based on the revised set of user-indicated significant portions. For example, the analysis engine 210 may use the revised set of user-indicated significant portions as additional training data for the machine-learning model. In some examples, the analysis engine 210 may use some or all of the original set of user-indicated significant portions of the target to update the machine-learning model.

The system 200 may thus enhance cooperation between the user and the analysis engine 210 in performing a task. The system 200 avoids providing information that may impede performance of the user while still providing the user with the benefits of the analysis engine 210. The system 200 also avoids unnecessarily identifying differences between the analysis engine 210 and the user or uses less conspicuous indications for the differences that may be less important to the user. In addition, by using several types of indications or soft outputs, the system 200 may provide additional detail and nuance around the differences between the analysis engine 210 and the user. Accordingly, the system 200 may provide for more efficient cooperation between the user and the analysis engine 210.

Figure 3:
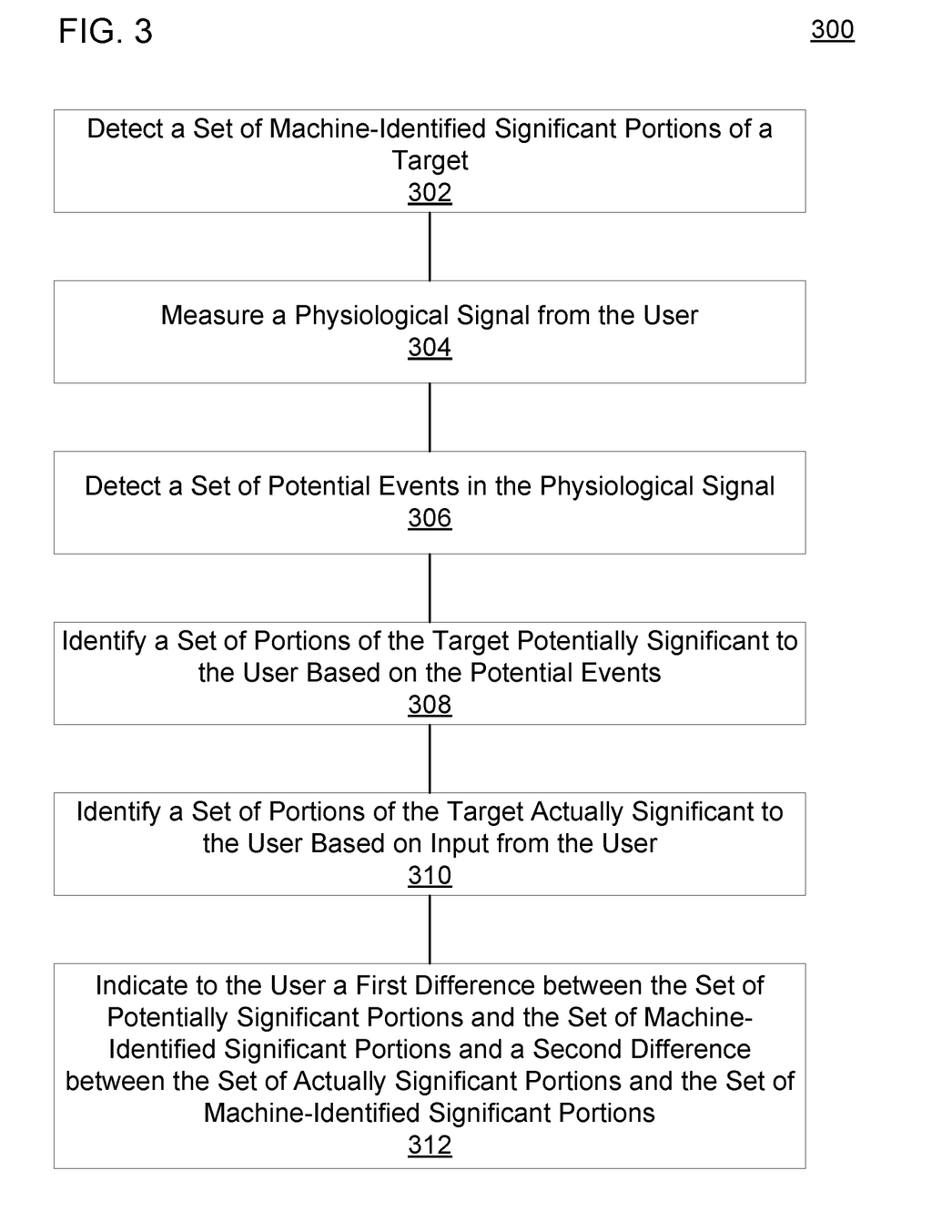
FIG. 3 is a flow diagram of an example method to identify differences between physiologically-identified significant portions of a target, machine-identified significant portions, and user-indicated significant portions.

FIG. 3 is a flow diagram of an example method 300 to identify differences between physiologically-identified significant portions of a target, machine-identified significant portions, and user-indicated significant portions. A processor may perform elements of the method 300. At block 302, the method 300 may include detecting a set of machine-identified significant portions of a target. For example, the processor may analyze the target to determine a portion of the target that is significant.

Block 304 may include measuring a physiological signal from the user. Measuring the physiological signal may include measuring any of the previously discussed physiological signals. Block 306 may include detecting a set of potential events in the physiological signal. Detecting the set of potential events in the physiological signal may include determining a location in time of a portion of the physiological signal that corresponds to a physiological response indicative of the brain responding to a stimulus. At block 308, the method 300 may include identifying a set of portions of the target potentially significant to the user based on the potential events. For example, identifying a potentially significant portion of the target may include identifying the portion of the target that caused the physiological response corresponding to the potential event because that portion of the target was being observed by the user.

At block 310, the method 300 may include identifying a set of portions of the target actually significant to the user based on input from the user. The user may select portions of the target that are significant to the user via a user interface that presents the target or a representation of the target to the user. The selected portions may be included in the set of portions of the target actually significant to the user.

Block 312 may include indicating to the user a first difference between the set of potentially significant portions and the set of machine-identified significant portions and a second difference between the set of actually significant portions and the set of machine-identified significant portions. For example, the first difference may be a portion of the target included in the set of potentially significant portions and not included in the set of machine-identified significant portions or may be a portion of the target included in the set of machine-identified significant portions and not included in the set of potentially significant portions. Similarly, the second difference may be a portion of the target included in the set of actually significant portions and not included in the set of machine-identified significant portions or may be a portion of the target included in the set of machine-identified significant portions and not included in the set of actually-significant portions. Referring to FIG. 2, in an example, the analysis engine 210 may perform block 302, the input engine 205 may perform blocks 304 or 310, the event engine 220 may perform blocks 306 or 308, and the output engine 240 may perform block 312.

Figure 4:
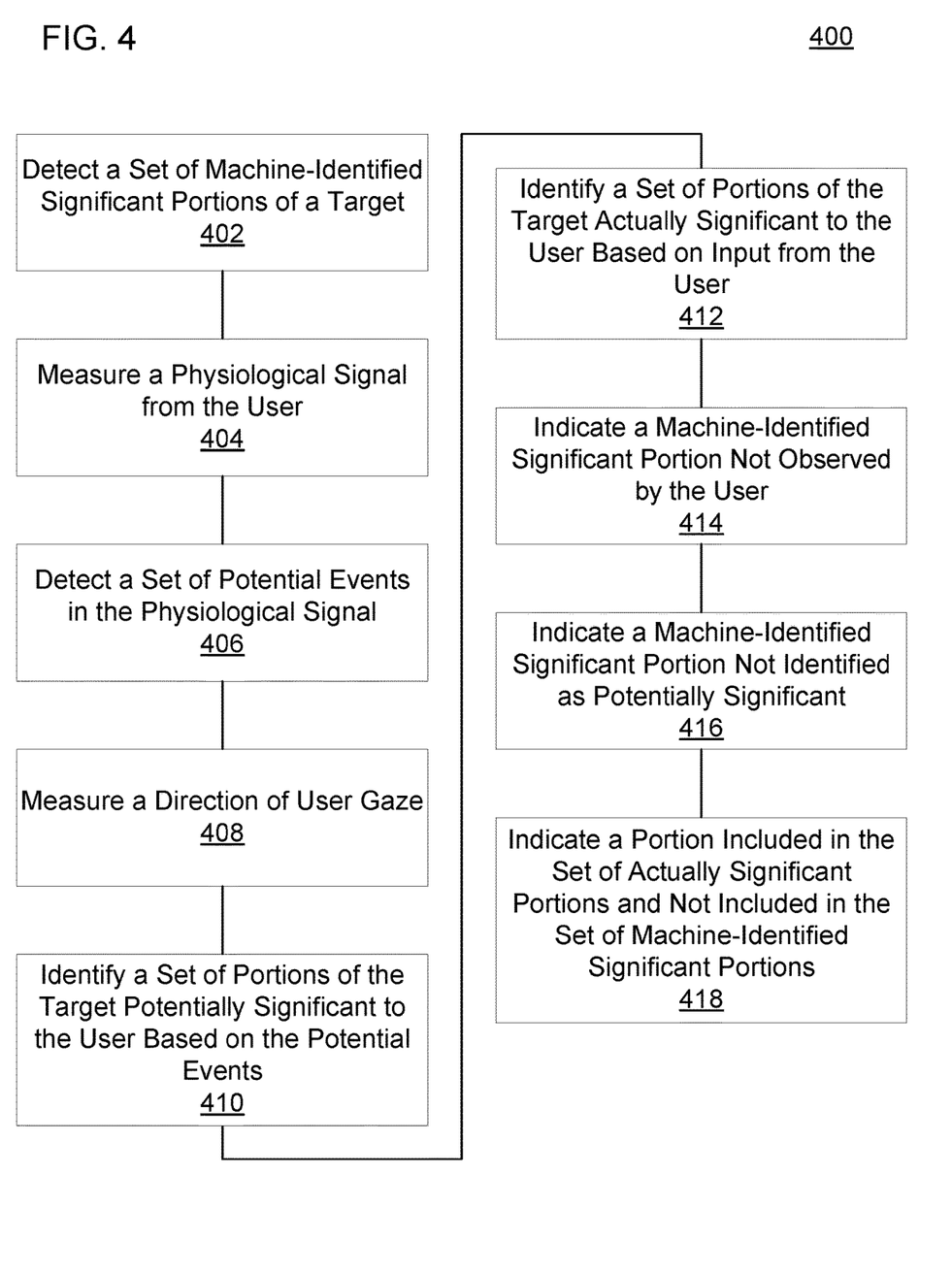
FIG. 4 is a flow diagram of another example method to identify differences between physiologically-identified significant portions of a target, machine-identified significant portions, and user-indicated significant portions.

FIG. 4 is a flow diagram of another example method 400 to identify differences between physiologically-identified significant portions of a target, machine-identified significant portions, and user-indicated significant portions. A processor may perform elements of the method 400. At block 402, the method may include detecting a set of machine-identified significant portions of a target. For example, significant portions of the target may be detected using a machine-learning model. In an example, areas of an image or a three-dimensional scene may be analyzed by the machine-learning model to identify which areas are significant.

Block 404 may include measuring a physiological signal from the user. For example, a sensor may generate the physiological signal as a digital or analog electrical signal that varies based on a physiological characteristic of the user. Measuring the physiological signal may include reading the value of the physiological signal from the sensor. Block 406 may include detecting a set of potential events in the physiological signal. For example, detecting a potential event may include determining that the physiological signal satisfies a threshold, satisfies the threshold for a predetermined period of time, or the like. Detecting the potential event may include comparing the measured physiological signal to a physiological signal for a known event (e.g., using a correlation function) and determining whether the measured physiological signal is sufficiently similar to the physiological signal for the known event (e.g., whether an output of the correlation function satisfies a threshold).

At block 408, the method 400 may include measuring a direction of user gaze. For example, the orientation of the user's eyes or pupils may be measured to determine the direction in which the user is looking. Measuring the direction of user gaze may include determining a location on the target (e.g., a portion of the target) at which the user is directing their target. Measuring the direction of user gaze may include storing eye tracking data. The eye tracking data may include indications of the locations on the target at which the user was directing their gaze and may include the times at which the user gazed at each of the indicated locations.

Block 410 may include identifying a set of portions of the target potentially significant to the user based on the potential events. The potential events may be compared to the eye tracking data to determine which portions of the target correspond to the potential events. For example, the location in time of the potential event may be matched to a time in the eye tracking data so as to determine a corresponding location on the target in the eye tracking data. The determined location on the target may be included in the set of potentially significant portions, for example, by storing an indication of the determined location. Matching the time of the potential event to the time in the eye tracking data may include adjusting for a delay between stimulus and physiological response. For example, the delay may be a predetermined offset for the particular physiological signal or physiological response.

At block 412, the method 400 may include identifying a set of portions of the target actually significant to the user based on input from the user. In an example, the target may be an image or scene displayed to the user (e.g., via a display, augmented or virtual reality headset, or the like), and the user may select a location on the image or scene (e.g., using a mouse, a touch screen, a virtual reality controller, or the like). The selected location may be included as a portion of the target in the set of actually significant portions, for example, by storing an indication of the selected location.

At block 414, the method 400 may include providing a first indication of one of the set of machine-identified significant portions not observed by the user. For example, the set of machine-identified significant portions of the target may be compared to the portions of the target observed by the user to determine a portion of the target that was not observed by the user but was identified as significant at block 402. In an example, each portion of the target identified as significant by the machine-learning model may be compared to the eye tracking data. A location not included anywhere in the eye tracking data but identified as significant by the machine-learning model may be displayed to the user.

Block 416 may include providing a second indication of another of the set of machine-identified significant portions observed by the user but not identified as one of the set of potentially significant portions. For example, the set of potentially significant portions identified at block 410 may be compared to the set of machine-identified significant portions identified at block 402 to determine a machine-identified significant portion not included in the set of potentially significant portions. The second indication may be provided based on the determination that the machine-identified significant portion was not included in the set of potentially significant portions. In an example, it may be determined whether that machine-identified significant portion is included in the eye tracking data, for example, to determine which type of indication to provide.

In an example, the second indication may be provided in substantially real time. For example, it may be determined that the user is observing a portion of the target included in the set of machine-identified significant portions. Based on a potential event not being detected, the second indication may be provided. It may be determined that the portion of the target has not been detected based on a predetermined amount of time passing, based on the user changing observation to a new portion of the target, or the like.

In an example, the first indication may not be provided in real time. For example, once the user has finished observing the target, it may be determined whether the eye tracking data for the target includes each portion of the target in the set of machine-identified significant portions. In some examples, different thresholds may be used to determine the portions to include in the set of machine-identified significant portions used to determine the first indications versus the set used to determine that second indications. In an example, a higher threshold may be used to define the set of machine-identified significant portions used for determining the second indication than is used to define the set of machine-identified significant portions used for determining the first indication. Portions of the target that were observed but did not cause a physiological response may be less likely to be significant than portions of the target that were not observed at all.

At block 418, the method 400 may include indicating a portion included in the set of actually significant portions and not included in the set of machine-identified significant portions (e.g., providing a third indication). For example, the portion may be a false positive if it is included in the set of portions identified as actually significant by the user but is not included in the set of machine-identified significant portions. In an example, the indication may be provided in substantially real time. The indication may be provided in response to the user input indicating the portion is actually significant. In response to the portion being indicated by the user, the indicated portion may be compared to portion included in the set of machine-identified significant portions to determine if there is a corresponding portion in that set. If no corresponding portion is found, the indication may be provided. In an example, the analysis engine 210 of FIG. 2 may perform block 402, the input engine 205 may perform block 404, 408, or 412, the event engine 220 may perform block 406 or 410, and the comparison engine 230 or the output engine 240 may perform blocks 414, 416, or 418.

Figure 5:
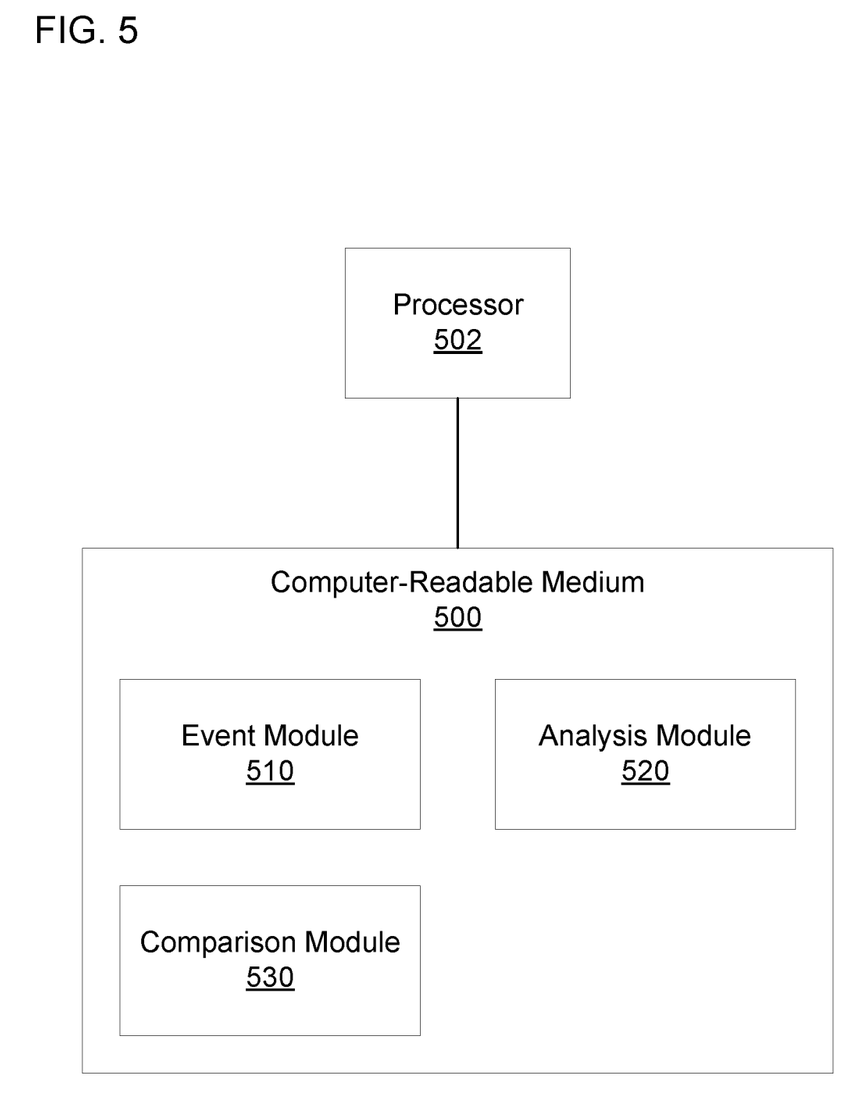
FIG. 5 is a block diagram of an example computer-readable medium including instructions that cause a processor to identify differences between physiologically-identified significant portions of a target and machine-identified significant portions.

FIG. 5 is a block diagram of an example computer-readable medium 500 including instructions that, when executed by a processor 502, cause the processor 502 to identify differences between physiologically-identified significant portions of a target and machine-identified significant portions. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc.

The computer-readable medium 500 may include an event module 510. As used herein, a "module" (in some examples referred to as a "software module") is a set of instructions that when executed or interpreted by a processor or stored at a processor-readable medium realizes a component or performs a method. The event module 510 may include instructions that, when executed, cause the processor 502 to determine a set of portions of a target potentially significant to a user based on eye tracking data and a physiological signal. For example, the event module 510 may cause the processor 502 to determine whether a currently observed portion of the target is potentially significant based on the physiological signal and to determine which portion of the target is currently observed and thus potentially significant based on the eye tracking data.

The computer-readable medium 500 may include an analysis module 520. The analysis module 520 may cause the processor 502 to detect a set of machine-identified significant portions of the target. For example, the analysis module 520 may cause the processor 502 to evaluate a portion of the target to determine whether that portion satisfies a condition qualifying it as significant. Based on the portion satisfying the condition, the analysis module 520 may cause the processor 502 to include that portion in the set of machine-identified significant portions.

The computer-readable medium 500 may include a comparison module 530. The comparison module 530 may cause the processor 502 to identify a difference between the set of potentially significant portions and the set of machine-identified significant portions. For example, the comparison module 530 may cause the processor 502 to determine a portion of the target included in one but not the other of the set of potentially significant portions and the set of machine-identified significant portions. In an example, when executed by the processor 502, the event module 510 may realize the event engine 120 of FIG. 1, the analysis module 520 may realize the analysis engine 110, or the comparison module 530 may realize the comparison engine 130.

Figure 6:
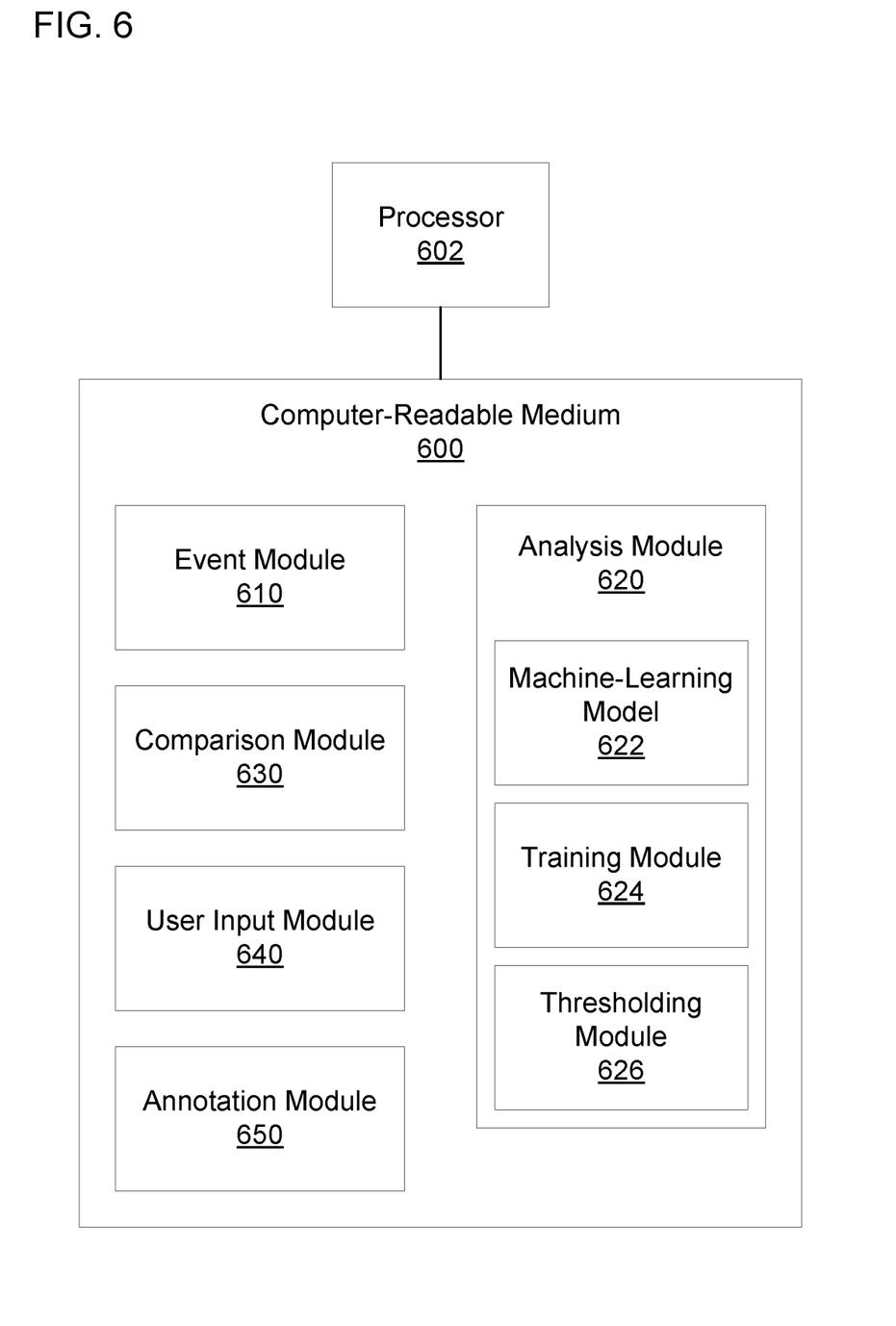
FIG. 6 is a block diagram of another example computer-readable medium including instructions that cause a processor to identify differences between physiologically-identified significant portions of a target and machine-identified significant portions.

FIG. 6 is a block diagram of another example computer-readable medium 600 including instructions that, when executed by a processor 602, cause the processor 602 to identify differences between physiologically-identified significant portions of a target and machine-identified significant portions. The computer-readable medium 600 may include an event module 610. The event module 610, when executed by the processor 602, may cause the processor 602 to determine a set of portions of a target potentially significant to a user based on eye tracking data and a physiological signal. The event module 610 may cause the processor 602 to determine when the values of the physiological signal are consistent with a physiological response. The event module 610 may cause the processor 602 to determine which portion of the target was receiving the user's gaze in advance of the physiological response based on the eye tracking data and thus which portion of the target gave rise to the physiological response.

The computer-readable medium 600 may include an analysis module 620. The analysis module 620 may cause the processor 602 to detect a set of machine-identified significant portions of the target. For example, the analysis module 620 may include a machine-learning model 622. The analysis module 620 may detect the set of machine-identified significant portions with the machine-learning model 622. The machine-learning model 622 may have been trained to distinguish significant portions of a target from non-significant portions of the target based on a dataset that included significant and non-significant portions of targets.

The computer-readable medium 600 may include a comparison module 630. The comparison module 630 may cause the processor 602 to identify a difference between the set of potentially significant portions and the set of machine-identified significant portions. The computer-readable medium 600 may include a user input module 640. The user input module 640 may cause the processor 602 to identify a set of portions actually significant to the user based on input from the user. For example, the user input module 640 may cause the processor 602 to receive user input that includes indications of significant portions of the target. The comparison module 630 may cause the processor 602 to perform a two- or three-way comparison between any pair of or all of the set of potentially significant portions, the set of machine-identified significant portions, and the set of actually significant portions to identify differences in which portions are included in the sets being compared.

The analysis module 620 may include a training module 624. The training module 624 may cause the processor 602 to update the machine-learning model 622. In an example, the comparison module 630 may cause the processor 602 indicate the difference between the set of potentially significant portions and the set of machine-identified significant portions to the user. The user input module 640 may cause the processor 602 to identify a revised set of portions actually significant to the user based on additional input from the user. For example, the user input module 640 may cause the processor 602 to receive input indicating portions of the target that should be added or removed from the set of actually significant portions. The training module 624 may cause the processor 602 to update the machine-learning model 622 based on the revised set of actually significant portions. For example, the revised set of actually significant portions or portions not included in the revised set of actually significant portions may be used as training data for the machine-learning model 622. In an example, the set of actually significant portions without revisions or portions not included therein may be used as training data for the machine-learning model 622.

The computer-readable medium 600 may include an annotation module 650. The comparison module 630 may cause the processor 602 to identify a portion of the target actually significant to the user that matches one of the set of machine-identified significant portions. For example, the comparison module 630 may cause the processor 602 to identify a portion of the target included in both the set of actually significant portions and the set of machine-identified-significant portions. The annotation module 650 may cause the processor 602 to prepare an annotation describing a reason the actually significant portion was identified. For example, the machine-learning model 622 may include an indication of the reason in the output of the machine-learning model 622 (e.g., which of several output nodes was activated), or the annotation module 650 may cause the processor 602 to analyze the identified portion of the target or computations (e.g., neuron activations) of the machine-learning model 622 to determine the reason. The annotation module 650 may cause the processor 602 to identify text corresponding to the identified reason or to prepare text based on properties of the portion of the target.

The comparison module 630 may cause the processor 602 to determine whether to indicate to the user a portion actually significant to the user not included in the set of machine-identified significant portions based on a machine-identified probability of significance determined for the actually significant portion. For example, the analysis module 620 may include a thresholding module 626. The thresholding module 626 may include thresholds for various situations or cause the processor 602 to determine modifications to a threshold based on the various situations. In an example, a different threshold may be used to define the set of machine-identified significant portions when comparing to the set potentially significant portions than when comparing to the set of actually significant portions. The thresholding module 626 may cause the processor 602 to determine which threshold should be as a comparison point for the soft output of the machine-learning model 622 (e.g., the machine-identified probability of significance) when determining portions to include in the set of machine-identified significant portions. A higher threshold may be used when comparing the set of machine-identified significant portions to the set of potentially significant portions than when comparing the set machine-identified significant portions to the set of actually significant portions or vice versa. Referring to FIG. 2, in an example, when executed by the processor 602, the event module 610 may realize the event engine 220, the analysis module 620, training module 624, or thresholding module 626 may realize the analysis engine 210, the comparison module 630 or the annotation module 650 may realize the comparison engine 230 or the output engine 240, or the user input module 640 may realize the input engine 205.

The above description is illustrative of various principles and implementations of the present disclosure. Numerous variations and modifications to the examples described herein are envisioned. Accordingly, the scope of the present application should be determined only by the following claims.

What is claimed is:

1. A system comprising:
   an analysis engine to detect a first set of significant portions of a target;
   an event engine to:
   detect a set of potential events in a physiological signal, and identify a second set of significant portions of the target based on the set of potential events; and
   a comparison engine to identify a difference between the first set of significant portions and the second set of significant portions; and
   an input engine to measure the physiological signal, to measure eye tracking data, and to receive a set of user-indicated significant portions, wherein the event engine is to compare the eye tracking data to the set of potential events to identify the second set of significant portions, and wherein the comparison engine is to further compare the set of user-indicated significant portions to the first set of significant portions and the second set of significant portions.

2. The system of claim 1, wherein the target is selected from the group consisting of an image, a three-dimensional scene, an audio signal, and a touch target.

3. The system of claim 1, further comprising an output engine to generate an indication of the difference between the first set of significant portions and the second set of significant portions and to cause the indication to be provided to a user.

4. The system of claim 1, wherein the first set of significant portions or the second set of significant portions is an empty set.

5. A method, comprising:
   detecting, using a processor, a set of machine-identified significant portions of a target;
   measuring a physiological signal from a user;
   detecting, using the processor, a set of potential events in the physiological signal;
   identifying, using the processor, a set of portions of the target potentially significant to the user based on the potential events;
   identifying, using the processor, a set of portions of the target actually significant to the user based on input from the user;
   indicating to the user a first difference between the set of potentially significant portions and the set of machine-identified significant portions and a second difference between the set of actually significant portions and the set of machine-identified significant portions; and
   measuring a direction of user gaze, wherein indicating the first difference to the user comprises providing a first indication of one of the set of machine-identified significant portions not observed by the user and providing a second indication of another of the set of machine-identified significant portions observed by the user but not identified as one of the set of potentially significant portions.

6. The method of claim 5, wherein measuring the physiological signal comprises measuring an electroencephalography signal.

7. The method of claim 5, wherein providing the second indication comprises providing the second indication in substantially real time.

8. The method of claim 5, wherein indicating the second difference to the user comprises indicating a portion included in the set of actually significant portions and not included in the set of machine-identified significant portions.

9. A non-transitory computer-readable medium comprising instructions that, when executed by a processor, cause the processor to:
   determine a set of portions of a target potentially significant to a user based on eye tracking data and a physiological signal;
   detect a set of machine-identified significant portions of the target;
   identify a difference between the set of potentially significant portions and the set of machine-identified significant portions;
   identify a set of portions actually significant to the user based on input from the user;
   indicate the difference to the user;
   identify a revised set of portions actually significant to the user based on additional input from the user;
   and update a machine-learning model based on the revised set of actually significant portions.

10. The computer-readable medium of claim 9, wherein the instructions cause the processor to detect the set of machine-identified significant portions with the machine-learning model.

11. The computer-readable medium of claim 9, wherein the instructions cause the processor to identify a portion of the target actually significant to the user that matches one of the set of machine-identified significant portions, and prepare an annotation describing a reason the actually significant portion was identified.

12. The computer-readable medium of claim 9, wherein the instructions cause the processor to determine whether to indicate to the user a portion actually significant to the user not included in the set of machine-identified significant portions based on a machine-identified probability of significance determined for the actually significant portion.

* * * * *